US008831812B2

(12) United States Patent
Blessing

(10) Patent No.: US 8,831,812 B2
(45) Date of Patent: Sep. 9, 2014

(54) METHOD FOR OPERATING A HYBRID DRIVETRAIN

(71) Applicant: GETRAG Getriebe- und Zahnradfabrik Hermann Hagenmeyer GmbH & Cie KG, Untergruppenbach (DE)

(72) Inventor: Uli Christian Blessing, Heilbronn (DE)

(73) Assignee: GETRAG Getriebe- und Zahnradfabrik Hermann Hagenmeyer GmbH & Cie KG, Untergruppenbach (DE)

(*) Notice: Subject to any disclaimer, the term of this patent is extended or adjusted under 35 U.S.C. 154(b) by 0 days.

(21) Appl. No.: 14/026,956

(22) Filed: Sep. 13, 2013

(65) Prior Publication Data

US 2014/0012452 A1    Jan. 9, 2014

Related U.S. Application Data

(63) Continuation of application No. PCT/EP2012/055411, filed on Mar. 27, 2012.

(30) Foreign Application Priority Data

Mar. 29, 2011   (DE) .................. 10 2011 016 131

(51) Int. Cl.
*B60L 9/00* (2006.01)
(52) U.S. Cl.
USPC ............................................. 701/22
(58) Field of Classification Search
None
See application file for complete search history.

(56) References Cited

U.S. PATENT DOCUMENTS 8,380,404 B2 * 2/2013 Marcigliano et al. .......... 701/54
2003/0106767 A1 * 6/2003 Beneton et al. ............ 192/111 A

FOREIGN PATENT DOCUMENTS

| DE | 44 22 636 A1 | 1/1998 |
| DE | 100 35 027 A1 | 1/2002 |
| DE | 101 53 509 A1 | 8/2002 |
| DE | 10 2004 043 589 A1 | 4/2006 |
| DE | 10 2006 034 933 A1 | 1/2008 |
| DE | 601 29 071 T2 | 4/2008 |
| DE | 10 2009 004 671 A1 | 9/2009 |
| DE | 10 2008 020 842 A1 | 10/2009 |
| EP | 1 366 949 A1 | 12/2003 |
| EP | 1 452 375 A2 | 9/2004 |
| EP | 1 939 059 A2 | 7/2008 |
| EP | 2 436 571 A1 | 4/2012 |

OTHER PUBLICATIONS

International Preliminary Report on Patentability; Application No. PCT/EP2012/055411; Oct. 10, 2013.
PCT International Search Report for International Application No. PCTEP2012/055411 dated Sep. 10, 2012.

* cited by examiner

*Primary Examiner* — Thomas Tarcza
*Assistant Examiner* — Adam Alharbi
(74) *Attorney, Agent, or Firm* — Knobbe Martens Olson & Bear, LLP

(57) ABSTRACT

A method for operating a hybrid drivetrain for a motor vehicle. Power is provided by an internal combustion engine in a first operating mode. Power is provided by an electric machine in a second operating mode. A change from one operating mode into the other operating mode is carried out according to the state of at least one of the drivetrain and the motor vehicle. The change of operating mode is controlled according to at least one switching variable, which is a function of a requested power target value.

14 Claims, 4 Drawing Sheets

METHOD FOR OPERATING A HYBRID DRIVETRAIN

CROSS-REFERENCE TO RELATED APPLICATIONS

This is a Continuation application of International patent application PCT/EP 2012/055411, filed Mar. 27, 2012, which claims the priority of German patent application DE 10 2011 016 131.7, filed Mar. 29, 2011.

BACKGROUND

The present invention relates to a method for operating a hybrid drivetrain for a motor vehicle, in which power is provided by an internal combustion engine in a first operating mode and power is provided by an electric machine in a second operating mode, wherein a change from one operating mode into the other operating mode is carried out according to the state of the drivetrain and/or the motor vehicle.

In the field of drivetrains for motor vehicles, what are known as hybrid drivetrains have long been known. These have a first drive unit, in the form an internal combustion engine for generating driving power, and also a second drive unit, which contains an electric machine arrangement.

Besides what are known as mild hybrid concepts, in which an electric machine is only used to assist the internal combustion engine, full hybrid concepts are also known. In full hybrid concepts the vehicle can be driven either only by means of the internal combustion engine or only by means of the electric machine arrangement and, where necessary, in mixed hybrid operation. This type of hybrid drivetrain will be used as a general basis in the present case.

The operation of an internal combustion engine in a motor vehicle typically requires a start-up clutch and a gear box. Here, it is known to form the gear box steplessly. It is also known to combine the internal combustion engine with an automated shifting gear box, for example an automatic shift gearbox (ASG), a twin-clutch gearbox (TCG), or a torque-converter automatic gearbox.

In the case of hybrid drivetrains, it is generally sought to drive the vehicle predominantly in the second operating mode, in which driving power is provided by the electric machine. The "bottle neck" in this case is usually the electric power source, which is generally formed as a battery.

Furthermore, it is generally possible to operate the internal combustion engine and the electric machine in parallel in a third operating mode. In what is known as a boost mode, driving power is provided in this case both by the internal combustion engine and also the electric machine. There is also the possibility in such a third operating mode to shift the load point of the internal combustion engine, wherein excess power is provided that can be used for example to charge the battery.

In the case of hybrid drivetrains of this type, it is generally also sought to carry out a regeneration (recuperating) operation during a braking process, such that the moment of inertia of the travelling vehicle is converted into regenerative power that can in turn be used to charge the battery.

Here, the change between operating modes is generally carried out by various control devices.

For example, it is known from document DE 100 35 027 A1 to carry out the selection of the operating mode on the basis of vehicle dynamics, driver behavior and available electric driving power, and additionally the route profile covered by the vehicle as a criterion for the selection of the operating mode. It is also known from this document to perform the transition to electromotive drive by decoupling the internal combustion engine after a period of delay, which is dependent on the route profile. It is also known from this document to perform the transition to internal-combustion-engine-powered operation or mixed operation after a period of delay dependent on the route profile.

It is also known from document DE 101 53 509 A1 for the controller controlling the charging of the battery to define a number of threshold values and to compare the status-of-charge with these threshold values in order to determine the operating mode of a starter/generator connected to the engine.

Document DE 601 29071 T2 discloses a vehicle control system for performing the transition between operating modes according to detected abnormalities in the drivetrain.

Document DE 10 2008 202842 A1 further discloses the provision, in a mild hybrid drivetrain, of a control device for switching between at least two operating modes, said control device being coupled to the brake pedal and designed in such a way that, in a first operating mode, the setting for the driving torque can be varied according to the position of the brake pedal.

It is also known (DE 10 2009 004 671 A1) to operate a drive system of a motor vehicle in a charge sustaining mode and a charge depletion mode, wherein the charge sustaining mode is requested when a piece of information concerning an anticipated environment meets a specific criterion.

Lastly, document DE 10 2006 034 933 A1 discloses a method for controlling a hybrid drivetrain, in which a plurality of control parameter sets having different target statuses of charge for a high-capacity battery is provided, wherein a respective operating mode of the vehicle is associated with the plurality of control parameter sets and a present operating mode is defined, wherein a control parameter set corresponding to the present operating mode is used to control a charging mode of the high-capacity battery with a corresponding target status-of-charge.

SUMMARY

In the case of hybrid drivetrains, there is generally a need to provide a concept that is as comprehensive as possible and can be easily expanded for controlling and selecting the various operating modes of the drivetrain.

This object is achieved in accordance with a first aspect of the invention with the method mentioned in the introduction in that the change of operating mode is controlled according to at least one switching variable, which is a function of a requested power target value. Due to the provision of a switching variable, a simplified state machine for operating mode changeover can be provided. Here, the most important physical variable is a power target value derived from a driver request.

In other words, power-dependent switching thresholds can be provided which can be easily varied. Any further influencing variable can be scaled and assessed in accordance with the influence on the power of the electric machine and can be incorporated into the switching variable.

In the method according to the invention, not only is a change between a purely electric driving mode and a purely internal-combustion-engine-powered driving mode possible, but preferably also a change into a third operating mode, in which driving power is provided in a combined manner, and/or into a fourth operating mode, in which the vehicle is braked.

Here, it is particularly preferred if the different operating modes are classified into four different states. Here, a first state relates to operation when the vehicle is at a standstill. A second state relates to operation with purely electromotive drive. A third state generally relates to a driving mode with internal combustion engine, wherein operating modes for boosting and/or for shifting the load point can be classified in this third state. A fourth state here relates purely to braking, wherein both regenerative braking and conventional braking may be included.

In the first state, in which the vehicle is at standstill, a distinction can also be made between the operating modes "OFF", "CHARGE AT STANDSTILL" and "START/STOP". In the second state, a distinction can be made between an operating mode in which positive electric driving power is provided ("ELECTRIC DRIVE"), and an operating mode in which an overrun operation by means of the electric machine is established.

It is also preferred if a "state machine" of this type can generally transition from an initial state "VEHICLE AT STANDSTILL" into one of the other three states. Here, the switching variable preferably indicates whether or not the associated operating mode change can be implemented, and in particular also whether or not a requested electric power can be provided.

The object is thus solved completely.

In the method according to the invention, it is particularly preferred if the switching variable is a binary variable.

In this case, the switching variable may assume only one of two values, for example "1" if the operating mode change is possible or if a requested (electric) power can be provided. The switching variable may also assume the value "0" if this change is not possible or a requested (electric) power cannot be provided.

In accordance with a further preferred embodiment, the switching variable is further a function of a limit power value of the electric machine.

For easier classification of the possibility of operating mode changes, what is known as a limit power value (or power limit value) is introduced and may represent the different states of the drivetrain and/or of the motor vehicle and/or of the ambient conditions.

In accordance with a preferred embodiment, the limit power value is a function of a maximum power value of the electric machine.

As a result, the maximum power that can be provided by the electric machine goes into the limit power value, whether the power is driving power provided by a motor or is regenerative power.

It is also preferred if the limit power value is a function of at least one limiting factor.

The limiting factor is preferably a limiting factor of the power and in particular characterizes time-dependent influencing variables of the hybrid drive. Here, the limiting factor can be defined for example by datasheets and/or by evaluation of measurements.

It is particularly preferred if the limiting factor is a value between zero and one.

A type of standardization is thus implemented through all influencing variables that play a role in an operating mode change and can be limited to the value range between zero and one. An easier association, in particular if the limit power value is a function of a number of limiting factors, is thus provided. In this case, the limiting factors preferably all have a value range between zero and one, such that a correlation between the limiting factors can be produced more easily.

It is thus preferred in particular if the limit power value is a function of a minimum value of a number of limiting factors.

The limit power value can thus always be focused on the "weakest member" of a chain of influencing factors, such that an operating mode change can be performed in a manner that is always reliable according to the limit power value and a resultant switching variable.

For example, the limiting factors, which each have a value range [0, 1], may then rule out an operating mode change if the minimum value of the number of limiting factors is "0". By contrast, if the value "1" is established, an unrestricted use or an operating mode change that is unrestricted in terms of the influencing variables concealed behind the limiting factors can be implemented.

It is particularly preferred if the limit power value is a function of one or more limiting factors of a group of limiting factors, including a first limiting factor, which is a function of the temperature of the electric machine, a second limiting factor, which is a function of the temperature of a power electronics of the electric machine, a third limiting factor, which is a function of the temperature of a battery, a fourth limiting factor, which in motor operation of the electric machine is a function of a status-of-charge of the battery, a fifth limiting factor, which in regenerative operation of the electric machine is a function of the status-of-charge of the battery, a sixth limiting factor, which is a function of a re-start time of the internal combustion engine, and a seventh limiting parameter which is a function of a torque reserve.

Depending on the selection of the operating mode, it is possible to use one or more of these limiting factors when determining the limit power value and the resultant switching variables. It is also possible to add to this group of limiting factors further influencing variables, such as ambient conditions (external temperature of the vehicle, route profile of the vehicle, driving style of the driver etc.) in comparatively simple manner.

On the whole, it is also preferred if a switchover of the switching variables from one binary value to the other is subject to a hysteresis function in at least one direction.

As a result of this measure, it is possible to avoid frequent changes of the switching variable. Here, the hysteresis function can be established with a time-dependent threshold, wherein the time-dependent threshold is preferably defined in the application phase and may preferably be different depending on the driving program or driving comfort.

In accordance with a further preferred embodiment, the characteristic curve of the switching variable is preferably memory-conditioned and can therefore preferably be calculated recursively under consideration of prior values of the switching variable.

It is particularly preferred if the switching variable is calculated recursively as follows:

$$s_{Lj}(k) = \theta_1(k) \cdot s_{Lj}(k-1) + \theta_2(k),$$

wherein $$\theta_1(k) = \begin{cases} 1 & \text{for } |P_{Lj}(k)| - \varepsilon_{Lj}(k) \le |P_{EM}(k)| \le |P_{Lj}(k)| \\ 0 & \text{otherwise} \end{cases}$$

$$\theta_2(k) = \begin{cases} 1 & \text{for } |P_{EM}(k)| < |P_{Lj}(k)| - \varepsilon_{Lj}(k) \\ 0 & \text{otherwise} \end{cases},$$

wherein
$P_{Lj}$=limit power value
$\varepsilon_{Lj}$=time-dependent threshold of the hysteresis function
$P_{EM}$=requested electric power of the electric machine.

By means of the recursive calculation, a changing driving style of the driver can be incorporated gradually into a corresponding change of the switching variable. Due to the form variables $\theta_1$ and $\theta_2$, the hysteresis is included in this case in order to avoid frequent changes to this switching variable.

On the whole, it is also preferred if, for a number of different changes from one operating mode into another operating mode, a switching variable is provided in each case, in accordance with which the respective change is controlled. Due to the provision of a number of switching variables, which are each a function of a limit power value which is in turn in each case a function of one or more (relevant) limiting factors, the operating mode change can be implemented in an ultimately simple manner by binary switching variables.

It is further preferable if the change of the operating mode is performed according to a re-start time and/or a speed difference between a speed of the internal combustion engine and a cranking output speed.

This embodiment, independently of the control of an operating mode change according to least one switching variable, constitutes its own invention in accordance with a second aspect.

In a second aspect of the present invention, when questioning whether or not an operating mode change can be carried out, the question as to how quickly an internal combustion engine can be restarted is also included.

Since the internal combustion engine is generally restarted by cranking by means of the electric machine, the time within which the internal combustion engine can be restarted is considerably dependent on the difference between a speed of the internal combustion engine and a speed of a member of the drivetrain used to start the internal combustion engine.

The cranking output speed is therefore preferably the speed of this member of the drivetrain. In particular, the difference in speed may be a difference between a primary side and secondary of a friction clutch.

It goes without saying that the features mentioned above and the features yet to be explained hereinafter can be used not only in the respective disclosed combination, but also in other combinations or in isolation without departing from the scope of the present invention.

BRIEF DESCRIPTION OF THE SEVERAL VIEWS OF THE DRAWING

Exemplary embodiments of the invention are illustrated in the drawing and will be explained in greater detail in the following description. In the drawing.

DETAILED DESCRIPTION OF PREFERRED EMBODIMENTS

Figure 1:
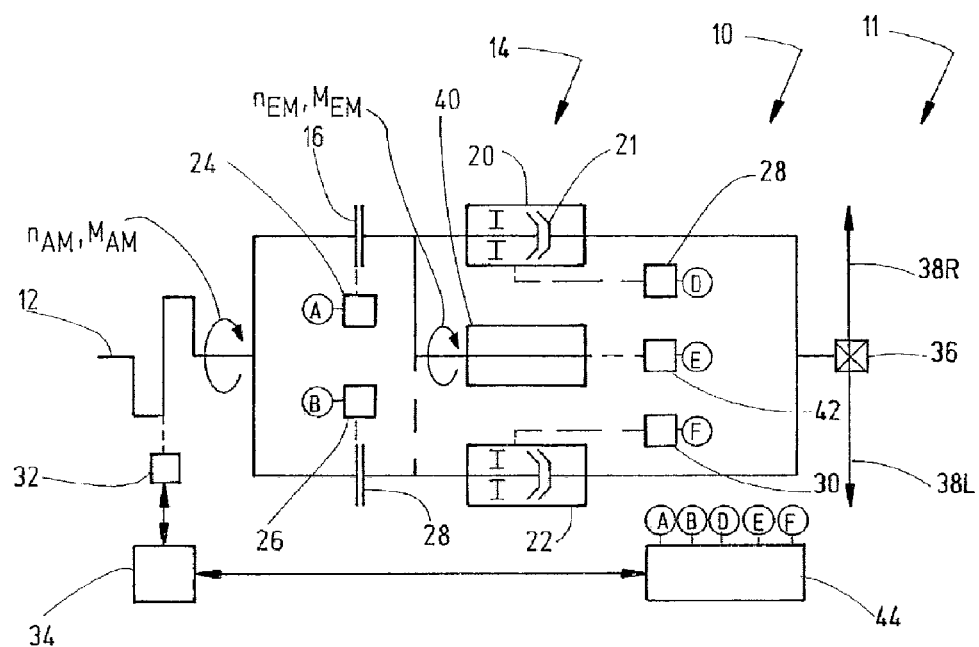
FIG. 1 shows a schematic illustration of a hybrid drivetrain for a motor vehicle.

In FIG. 1, a vehicle, such as a passenger car, is illustrated schematically and is denoted by 11. The motor vehicle has a drivetrain 10. The drivetrain has a drive motor 12 in the form of an internal combustion engine and also a twin-clutch gearbox 14.

The twin-clutch gearbox 14 contains a twin-clutch arrangement with a first friction clutch 16 and a second friction clutch 18.

The twin-clutch gearbox 14 also has a first sub-gearbox 20 and a second sub-gearbox 22. The first friction clutch 16 and the first sub-gearbox 20 form a first branch, and the second friction clutch 18 and the second sub-gearbox 22 form a second branch of the twin-clutch gearbox 14.

The twin-clutch gearbox 14 also contains a plurality of gear speeds, wherein the odd gear speeds are associated with the first sub-gearbox 20 and the even gear speeds are associated with the second sub-gearbox 22 (or vice versa). The twin-clutch gearbox 14 may have five, six, seven or more gear speeds. The gear speeds of the first sub-gearbox 20 are selected and deselected by means of respective shift clutches, in particular synchronous shift clutches, as is illustrated schematically in FIG. 1 at 21. Accordingly, the gear speeds of the second sub-gearbox 22 are selected and deselected by means of respective shift clutches.

The shift clutches are preferably are formed as synchronous shift clutches. Alternatively, it is also conceivable to form the shift clutches as simple jaw clutches. In this case, additional means for synchronization can be provided.

To actuate the first friction clutch 16, a first clutch actuator 24 is provided. Accordingly, a second clutch actuator 26 is used to actuate the second friction clutch 18. The clutch actuators 24, 26 can be formed hydraulically or electromechanically.

A first gearbox actuator 28 is provided for actuation of the shift clutches 21 of the first sub-gearbox 20. A second gearbox actuator 30 is provided for actuation of the shift clutches of the second sub-gearbox 22. Instead of two separate gearbox actuators, a combined actuator mechanism for actuation of the gear speeds of both sub-gearboxes 22, 22 can also be provided. The gearbox actuators can be hydraulic or electromechanical here.

Furthermore, a motor actuator 32, for example in the form of an electronic gas pedal, is provided for actuation of the drive motor 12. The motor actuator 32 is connected to a motor control device 34.

The drivetrain 10 further has differential 36, which is connected to the output of the twin-clutch gearbox 14 and distributes the driving power between a right and a left drive shaft 38L, 38R.

The drive motor 12 delivers a driving torque $M_{AM}$ and rotates at a speed $n_{AM}$.

The illustrated layout of the twin-clutch gearbox 14 and the illustrated sensor and actuator systems are to be understood merely by way of example as a basis for the description of the invention. The following description can be applied here both to drivetrains for longitudinal or horizontal mounting and also to other types of gearboxes that have a friction clutch on the input side that is used as a start-up and/or disconnect-type clutch, and also an element comparable to a shift clutch.

The driving power generated by the drive motor 12 is alternatively transmitted via the first friction clutch 16 and the first sub-gearbox 20 to the gearbox output shaft or via the second friction clutch 18 and the second sub-gearbox 22 to the gearbox output shaft. When driving power is transmitted via one of the sub-gearboxes (for example via gear speed three in the sub-gearbox 20), the friction clutch 18 of the other branch is opened such that an adjacent gear speed can already be engaged in the parallel (free) sub-gearbox 22. In traction operation, the next-highest gear speed is selected for example, and in overrun operation the next-lowest gear speed, for example. A gear change then takes place in that the two friction clutches 16, 18 are actuated in an overlapping manner in such a way that the gear change can be implemented under load. The drivetrain 10 is formed as a hybrid drivetrain. In this case, an electric machine 40 is assigned to the first sub-gearbox 20. More specifically, the electric machine 40 is fixedly connected to an input shaft of the first sub-gearbox 20, for example via a spur gear set. In other words, a rotor shaft (not described in greater detail) of the electric machine 40 has a speed that is proportional to the speed of the gearbox input shaft of the first sub-gearbox 20.

The electric machine 40 is fed from an energy store (for example a battery), which is not illustrated in greater detail and is controlled by a machine actuator 42. For this purpose, a corresponding power electronics can be provided either in the machine actuator 42 or associated with the electric machine 40.

The electric machine 40 is associated in the illustrated exemplary embodiment with the sub-gearbox 20 having the odd gear speeds. As a result, the motor vehicle for example can be started up purely electrically via gear speed one. Furthermore, for example with a driving operation via the second sub-gearbox 22, a regeneration can be implemented by closing one of the shift clutches of the first sub-gearbox 20 and leaving the first friction clutch 16 open.

The twin-clutch gearbox can be equipped with just one electric machine 40 of this type in one of the sub-gearboxes 20, 22. Alternatively it is possible for both sub-gearboxes 20, 22 to each be assigned an electric machine. In accordance with a further alternative embodiment, it is possible to connect an individual electric machine 40 via a suitable clutch arrangement alternatively to the input shaft of the first sub-gearbox 20 or to the gearbox input shaft of the second sub-gearbox 22.

Numeral 44 shows a control device that is connected to the clutch actuators 24, 26 and to the gearbox actuators 28, 30 and to the machine actuators 42. Furthermore the control device 44 is in communication with the engine control device 34.

The electric machine 40 delivers a torque $M_{EM}$ and rotates at a speed $n_{EM}$. The drivetrain 10 is formed as a full hybrid drivetrain, such that a purely electric drive or a purely internal-combustion-engine-powered drive is possible. Furthermore, the drivetrain can be used to provide a boost, for regeneration or also for a load point displacement. Start/stop operation can also be provided.

Figure 2:
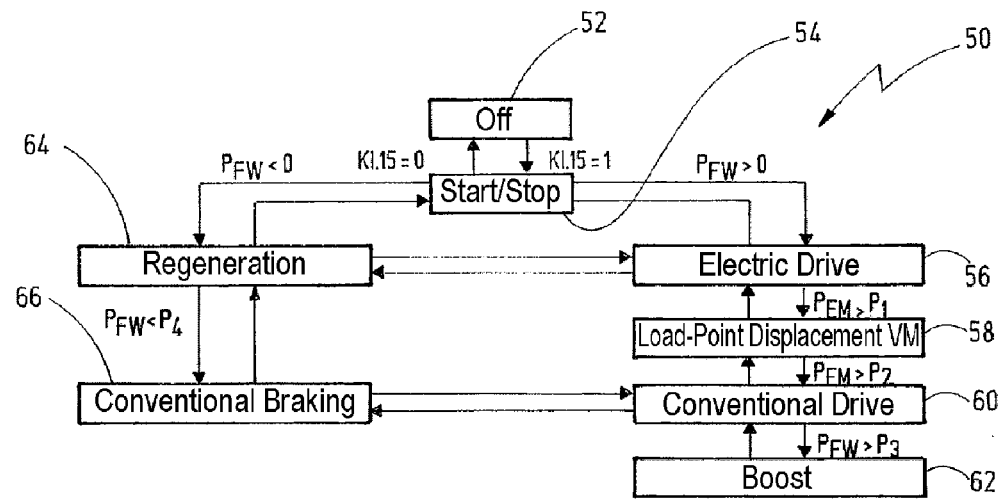
FIG. 2 shows a schematic illustration of different operating modes of such a hybrid drivetrain.

FIG. 2 shows a schematic view of the different operating modes in the form of a block diagram 50. Starting from a first operating mode "OFF" 52, in which the drivetrain is placed out of operation or is brought into force, for example by means of an ignition key, a transition is first made into the operating mode 54 ("START/STOP").

When a power target value derived from a driver input is $P_{FW}>0$, a change into the operating mode "ELECTRIC DRIVE" 56 is implemented. If a power $P_{EM}$ deliverable by the electric machine is greater than a first power threshold $P_1$, a transition is made into the operating mode "LOAD-POINT DISPLACEMENT" 58. If the electric power $P_{EM}$ that can be provided by the machine is greater than a second power threshold $P_2$, a transition is made into the operating mode "CONVENTIONAL DRIVE" 60, that is to say drive by means of the internal combustion engine.

If the requested power $P_{FW}$ is greater than a third power threshold $P_3$, a transition is made into the operating mode "BOOST" 62.

If the requested power $P_{FW}$ is less than zero, a transition is made into an operating mode "REGENERATION" 64. If, starting from here, the requested power $P_{FW}$ is less than a fourth power threshold $P_4$, a transition is made into the operating mode "CONVENTIONAL BRAKING" 66.

Furthermore, it is possible to change between the operating modes 56 and 64 and also between the operating modes 60 and 66.

Figure 3:
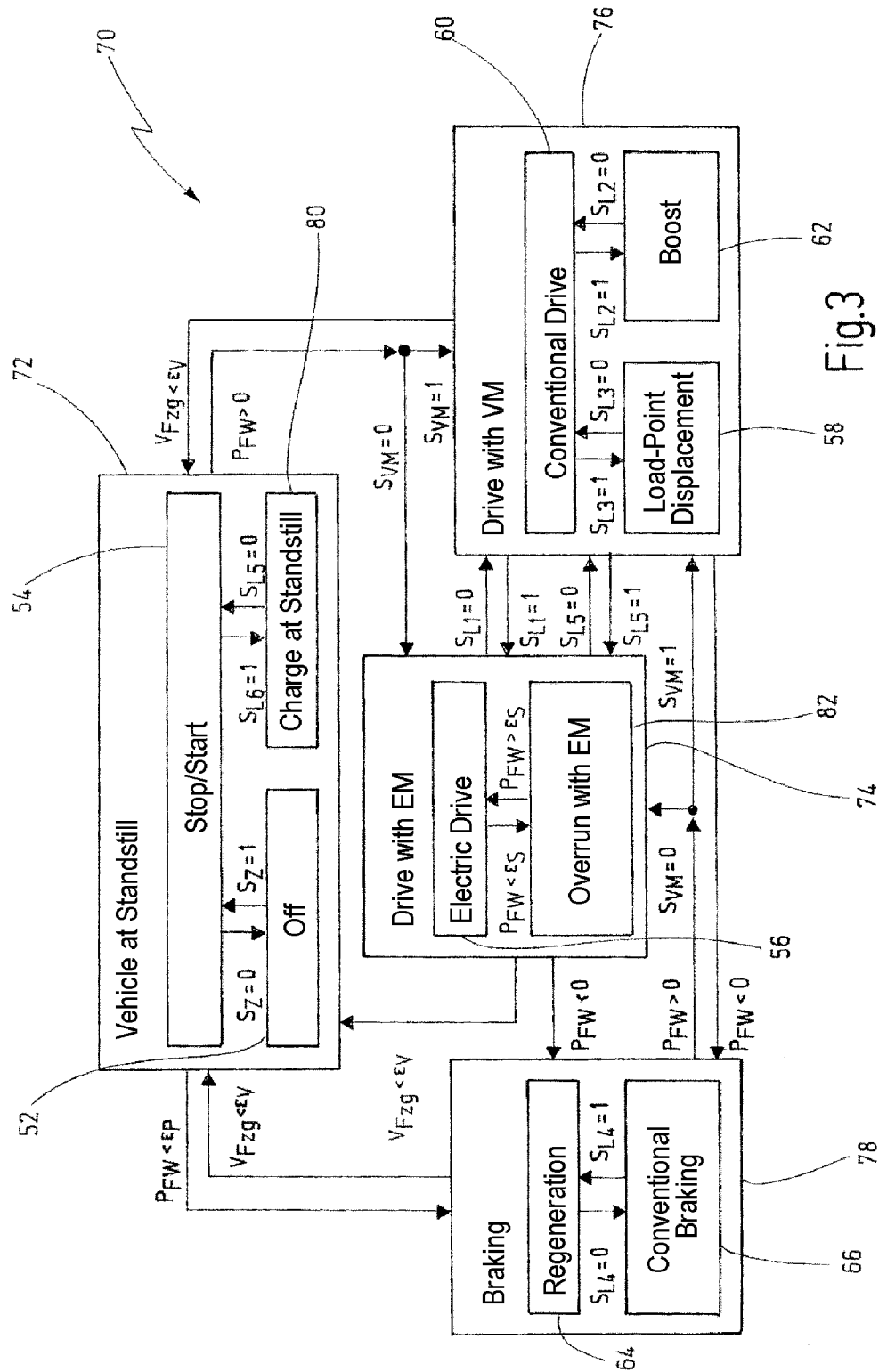
FIG. 3 shows a block diagram of a simplified state machine for controlling operating mode changes in accordance with the present invention.

FIG. 3 shows a block diagram 70 of a simplified state machine in the form of a hybrid manager, by means of which operating mode changes for positive vehicle speeds $v_{Fzg}$ can be implemented. The most important physical variable for actions of the operating strategy is the request for power derived from the driver input (power target value $P_{FW}$). The sign of this variable and a first power limit value $\epsilon_P$ decide whether, from the starting state "VEHICLE AT STANDSTILL" 72, a transition is made into a drive state 74 or 76 or into a state "BRAKING" 78. If the power target value $P_{FW}$ is greater than zero, a transition is made into the state "DRIVE WITH INTERNAL COMBUSTION ENGINE" 76 or into the state "DRIVE WITH ELECTRIC MACHINE" 74 depending on a status signal $s_{VM}$ for the internal combustion engine 12 ($s_{VM}=1$ if the internal combustion engine is running, $s_{VM}=0$ if the internal combustion engine is switched off). Since the internal combustion engine 12 is generally switched off before the start of a journey, a transition is initially made into the state "DRIVE WITH EM" 74, provided the energy store is sufficiently charged.

All operating modes 54-64, 80, 82 of this machine that require a use of the electric machine 40 with the power $P_{EM}\neq 0$ are monitored by means of respective switching variables $s_{Lj}$ in terms of the presently requested electrical power relative to the power that can be momentarily provided, wherein $s_{Lj}=1$ if requested electric power can be provided, and $s_{Lj}=0$ if requested electric power cannot be provided, where j=1, ..., 6.

By means of a first switching variable $s_{L1}=0$, the operating mode "ELECTRIC DRIVE" 56 is left in the event of an excessively high power request for the motor-powered operation of the electric machine 40 and a transition is made into the operating state "DRIVE WITH VM" 76. From there, the drivetrain could be switched back into the state "DRIVE WITH EM" by means of the switching variable $s_{L1}=1$ with a reduced power request or improved conditions for the use of the electric machine 40.

In the state "DRIVE WITH EM" 74, the decision is made under consideration of a further power limit value $\epsilon_S$ as to whether or not a change is made from the operating mode "ELECTRIC DRIVE" 56 into the operating mode "OVERRUN OPERATION WITH EM" 82. In the operating mode "OVERRUN OPERATION WITH EM" 82, a defined overrun torque is provided in regenerative operation and preferably leads to the same vehicle deceleration as with overrun operation of the internal combustion engine 12. If the vehicle speed $v_{Fzg}$ falls here below a limit value $\epsilon_v$, a transition is made into the state "VEHICLE AT STANDSTILL" 72. By contrast, with a negative power request ($P_{FW}<0$), a change is made into the state "BRAKING" 78. A switchover is implemented into the state "DRIVE WITH VM" 76 if, with $s_{L1}=0$, the electric machine 40 experiences a limitation in motor-powered operation or, with a fifth switching variable $s_{L5}=0$, a limitation occurs in regenerative operation.

Within the state "DRIVE WITH VM" 76, regenerative powers that have the potential to optimize the overall system are calculated in the operating mode "CONVENTIONAL DRIVE" 60 with average requirements of the power target value $P_{FV}$ in any operating point. If the established powers lie below the presently permissible limit values for operation of the electric machine 40, the state "LOAD-POINT INCREASE" 58 is activated by means of the switching variable $s_{L3}=1$. This transition can be made both in traction operation and also in overrun operation of the internal combustion engine 12. With high power target values $P_{FV}$, the maximum motor-powered torque $M_{EM}$ of the electric machine 40 achievable for a selected gear position is first established. The respective electric power $P_{EM}$ is then calculated on this basis. If this result lies within the present power limits of the electric machine 40, the operating mode "BOOST" 62 is activated by means of the switching variable $s_{L2}=1$. If the power target value $P_{VW}$ exceeds the present power limits, the demand on the electric machine 40 is reduced to the limit value. The transition to the operating mode "BOOST" 62 is only sensible in traction operation of the internal combustion engine 12. A switchover into the state "VEHICLE AT STANDSTILL" 72 is implemented when the vehicle speed is less than a pre-defined limit ($v_{Fzg}<\epsilon_v$).

With a power target value of $P_{FW}<0$, the state "BRAKING" 64 is activated. The allocation of the power target value to the conventional and the electric braking resource is performed by a braking coordinator, which will not be considered here in greater detail. For energy reasons, the provision of the power target value $P_{FV}$ by the regeneratively operated electric machine 40 is generally favored, however. If the regenerative power $P_{EM}$ requested by the braking coordinator moves within the range of power of the electric machine 40 that can be presently provided, the operating mode "REGENERATION" 64 is activated by means of the switching variable $s_{L4}=1$. If the power target value $P_{FW}$ lies outside this permissible range, the operating mode "REGENERATION" 64 with the permissible limit value is activated. The operating mode is left if the vehicle speed is below the limit $\epsilon_v$ or if a positive power target value $P_{FW}$ is again provided.

The operating mode is changed from "REGENERATION" 64 into "CONVENTIONAL BRAKING" 66 in accordance with the switching variable $s_{L4}$.

In the state "VEHICLE AT STANDSTILL" 72, the operating mode "STOP/START" 54 is activated during the transition of the vehicle to a standstill, wherein the internal combustion engine 12 is switched off. If the electric energy store is charged insufficiently, this state is left immediately and the operating mode "CHARGING AT STANDSTILL" 80 is activated by means of the switching variable $s_{L6}$. This switching variable $s_{L6}$ takes into consideration the power limit of the electric machine 40 in regenerative operation with only slightly increased idle speed of the internal combustion engine 12. An ignition variable $s_z$ is linked logically to an ignition key switch of the vehicle on-board power supply and enables transitions between the operating modes "STOP/START" 54 and "OFF" 52.

It can be seen that the transitions between the different operating modes in the four different states can be changed substantially by means of simple switching variables, which are each formed as binary variables and can each adopt the state "0" or "1"

Here, the switching variables $s_{Lj}$ are generally a function of a limit power value $P_{Lj}$ of the electric machine 40. The limit power value $P_{Lj}$ is here a function of a maximum power value $P_{EM,max}$ of the electric machine 40 and also a function of at least one "limiting factor" $\beta_i$. In order to allow a large number of ambient conditions to be incorporated into the switching variable $s_{Lj}$, a plurality of limiting factors $\beta_i$ are defined in the present case, which are each focused on specific ambient states or data sets of the components used in the drivetrain 10.

For example, influencing variables of the hybrid drive, such as the temperatures of individual components or the status-of-charge of the battery, are thus key parameters for deciding whether or not a change between operating modes can be implemented. In addition, restrictions for such a potential operating mode can be derived from these influencing variables and formulated in a limit power value $P_{Lj}$.

If the time-dependent influencing variables of the drivetrain 10 are denoted by $\alpha_i$, limiting factors $\beta_i$ of the power can be established for the operation of the electric machine 40 by evaluation of measurements and datasheets and can be described by the following functions:

$$\beta_i = f\{\alpha_i\}$$

$$i=1, \ldots, m_a$$

wherein $m_a$ denotes the number of influencing variables that are of significance for the respective operating modes with use of the electric machine 40.

By means of a standardization of all limiting factors $\beta_i$ to the value range [0, 1], the requested operation of the electric machine 40 can be ruled out by a valuation with "0". With the valuation with "1", an unrestricted use is enabled with regard to the considered influencing variable. In the state machine 70 of FIG. 3, transitions to operating modes with use of the electric machine 40 by means of the switching variables $s_{Lj}$ are linked to powers that can be provided, as described above. With the standardized limiting factors $\beta_i$, a limitation, per switching variable $s_{Lj}$, for the power of the electric machine 40 that can presently be provided is then allocated in the form of the limit power value $P_{Lj}$ in the following way:

$$P_{Lj} = \min\{\beta_{j1}, \ldots, \beta_{jk}\} \cdot P_{EM,max}$$

$$j=1, \ldots, 6.$$

In this function, it is firstly determined, by means of selection of the limiting factors, which of these limiting factors are relevant for the establishment of the limit power value $P_{Lj}$. The variable $P_{EM,max}$ characterizes the speed-dependent maximum power of the electric machine 40. For this variable, either the maximum motor power $P_{EM,M,max}$ or the maximum regenerative power $P_{EM,G,max}$ at the present speed is to be used depending on the requested use of the electric machine 40 in the operating mode in question.

In the operating strategy implemented by the state machine 70 in FIG. 3, it is continuously checked whether the power requested in an operating mode (power target value $P_{FW}$) of the electric machine lies within the limit power value $P_{Lj}$ that is relevant for the respective operating mode change. As a result, a change from one operating mode into an operating mode with operation of the electric machine 40 can be prevented, or such an operating mode can be ended, via the limiting factor $\beta_i$.

A number of system-induced influencing variables on the operating strategy will be described hereinafter. The characteristic curves of the limiting factors $\beta_i$ established therefrom are shown in FIGS. 4 to 10.

Figure 4:
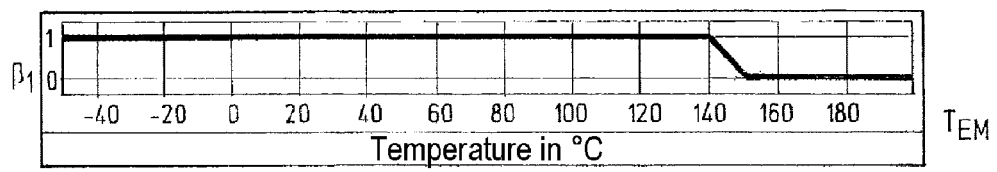
FIG. 4 shows a first limiting factor, which is a function of the temperature of the electric machine.

As is shown in FIG. 4, a first limiting factor $\beta_i$ is a function of the temperature $T_{EM}$ of the electric machine. If this temperature (normally the temperature in the region of a coil end) exceeds a specific limit value (here for example 140° C.), the limiting factor $\beta_i$ preferably falls linearly to a value of 0 (at a temperature of approximately 150° C.).

A performance characteristic map of the electric machine 40 can be used to determine the limiting factor $\beta_i$.

Figure 5:
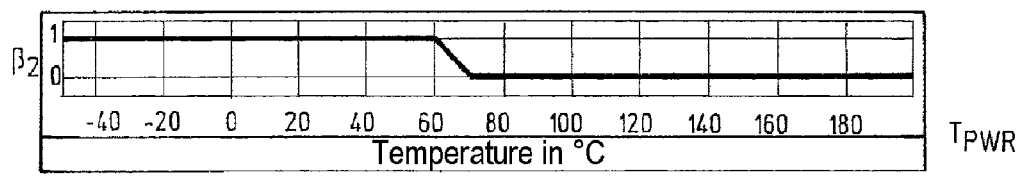
FIG. 5 shows a second limiting factor, which is a function of the temperature of a power electronics of the electric machine.

FIG. 5 shows a graph of a second limiting factor $\beta_1$, which is dependent on the temperature of a power electronics for controlling the electric machine 40. This temperature $T_{PWR}$ has a limiting effect from 60° C. on the second limiting factor $\beta_2$, such that it falls at 70° C. to 0.

Figure 6:
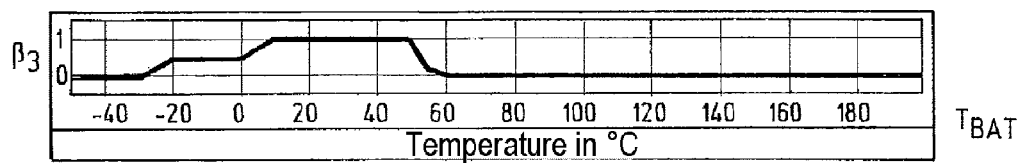
FIG. 6 shows a third limiting factor, which is a function of the temperature of a battery.

FIG. 6 shows a third limiting factor $\beta_3$, which is a function of the temperature $T_{BAT}$ of a battery. The limiting factor is zero below temperatures of −30° C. and above temperatures of approximately 55° C. In a range from approximately −20° C. to 0°, $\beta_3$ is approximately 0.5. Only in the range from approximately 10° C. to 50° C. is $\beta_3=1$. The temperature $T_{BAT}$ of the battery can be influenced by suitable cooling or heating devices in order to always keep the temperature $T_{BAT}$ in the optimal range where possible.

Figure 7:
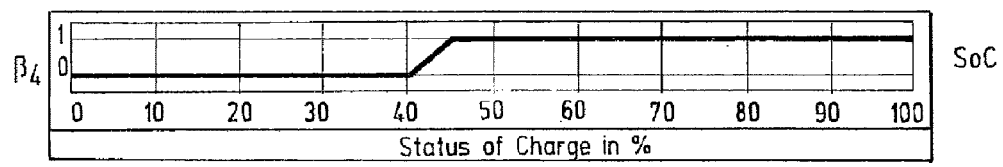
FIG. 7 shows a fourth limiting factor, which in motor operation of the electric machine is a function of a status-of-charge of the battery.

Two further important limiting factors $\beta_4$ and $\beta_5$ concern the status-of-charge (SoC) of the battery. For motor-powered operation, the limiting factor $\beta_4$ is relevant (FIG. 7). Below a value of SoC of 40%, the limiting factor $\beta_4=0$, whereas above approximately 45%, $\beta_4=1$.

Figure 8:
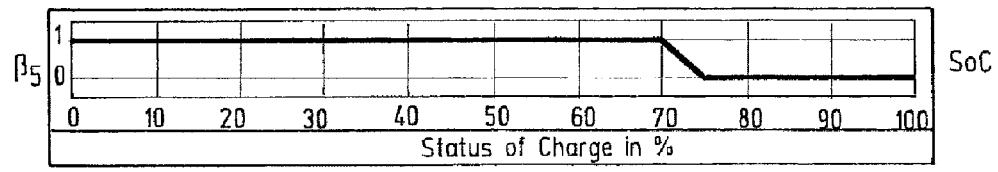
FIG. 8 shows a fifth limiting factor, which in regenerative operation of the electric machine is a function of the status-of-charge of the battery.

For regenerative operation of the electric machine, the limiting factor $\beta_5$ in FIG. 8 can be applied. Here, $\beta_5=1$ for statuses-of-charge SoC of below 70%. Furthermore, $\beta_5=0$ for statuses-of-charge SoC above 75%.

Figure 9:
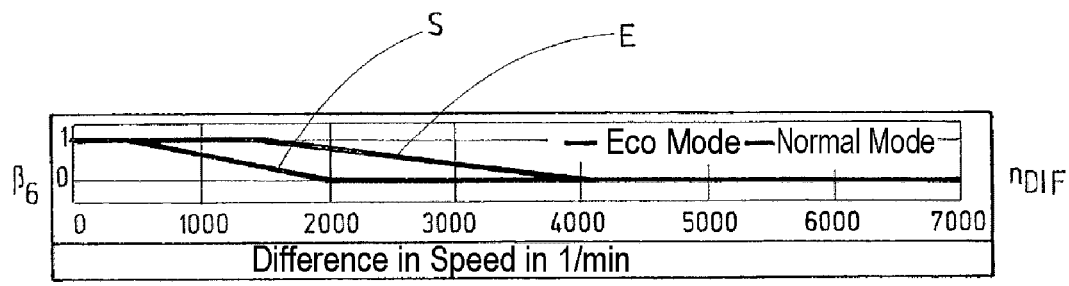
FIG. 9 shows a sixth limiting factor, which is a function of a difference in speed between a speed of the internal combustion engine and a cranking output speed.

FIG. 9 shows a limiting factor $\beta_6$ which takes into account a re-start time of the switched-off internal combustion engine 12. The re-start time is the time that is required for the renewed starting of the internal combustion engine 12. This time is a function of the difference in speed between a speed of the internal combustion engine and a cranking output speed. The cranking output speed is the speed of a member of the drivetrain used to start the internal combustion engine 12. This member is generally the speed of the secondary side of the clutch of the active sub-gearbox. In longer phases of electric drive 56, the speed $n_{AM}$ of the internal combustion engine is equal to zero. In some cases, when the operating mode "ELECTRIC DRIVE" 56 has to be left again quickly, the speed $n_{AM}$ of the internal combustion engine 12 may also be greater than zero.

In a normal mode S, the limiting factor $\beta_6$ is 1 for differences in speed below approximately 700 rpm, and is 0 for differences in speed above 2000 rpm. A linear transition occurs therebetween. In an eco mode, the limiting factor $\beta_6=1$ up to a difference in speed of approximately 1500 rpm, and =0 above 4000 rpm In a sport mode, the internal combustion engine 12 is never switched off, and therefore this limiting factor is not taken into account.

Figure 10:
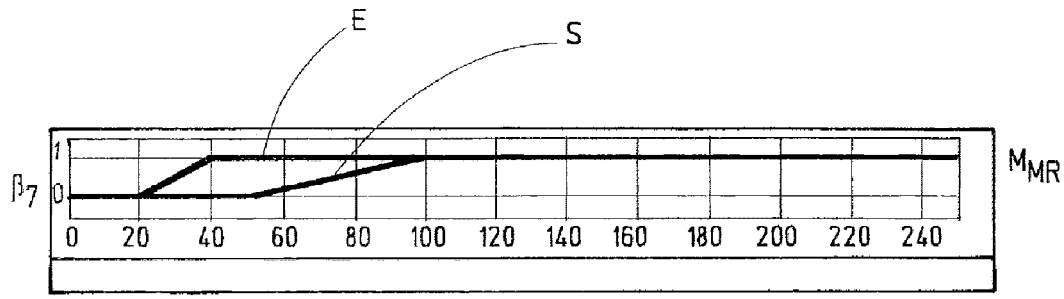
FIG. 10 shows a seventh limiting parameter, which is a function of a torque reserve.

A similar limiting factor $\beta_7$ is shown in FIG. 10. This concerns what is known as a torque reserve. In order to implement an increased torque derived from a driver input with low reaction times, a spontaneously retrievable torque is held with the torque reserve in order to still achieve a cumulative positive linear acceleration that can be sensed by the driver in the most frequent driving situations. The torque reserve $M_{MR}$ is used as an influencing variable in order to derive therefrom a possible limitation of the electric machine 40 in regenerative operation. For torques above 100 Nm, the limiting factor $\beta_7=1$ in a normal driving mode S, and $\beta_7=0$ below $M_{MR}=20$ Nm. By contrast, in an eco mode E, a torque reserve of 40 Nm is considered to be sufficient, such that, from this value, $\beta_7=1$.

By means of the above described limiting factors $\beta_i$, i= 1, . . . , 7, the respective limit power value $P_{Lj}$; for the use of the electric machine 40 can be established for each switching variable $s_{Lj}$. Furthermore, it is understood that further limiting factors can be included in the establishment of the switching variables in a simple manner, should this be desired.

It is also to be understood that the above-specified specific values of the individual influencing variables, with which the respective limiting factors change, are specified merely by way of example.

For the establishment of the switching variables, the limit power values $P_{Lj}$ are established as follows:

$$P_{L1}=\min\{\beta_1,\beta_3,\beta_4,\beta_5,\beta_6\}\cdot P_{EM,M,max}$$

$$P_{L2}=\min\{\beta_1,\beta_3,\beta_4,\beta_5\}\cdot P_{EM,M,max}$$

$$P_{L3}=\min\{\beta_2,\beta_3,\beta_4,\beta_5,\beta_7\}\cdot P_{EM,G,max}$$

$$P_{L4}=\min\{\beta_2,\beta_3,\beta_4,\beta_5\}\cdot P_{EM,G,max}$$

$$P_{L5}=\min\{\beta_2,\beta_3,\beta_4,\beta_5\}\cdot P_{EM,G,max}$$

$$P_{L6}=\min\{\beta_2,\beta_3,\beta_4,\beta_5,\beta_7\}\cdot P_{EM,G,max}$$

In other words, the respective limit power factors $P_{Lj}$ are each given as a function of a minimum value of the limiting factors included when establishing the respective limit power value $P_j$. If, for example for the establishment of the limit power factor $P_{L1}$, the limiting factors $\beta_1, \beta_3$ and $\beta_4$ and $\beta_6$ each have the value "1" or a value greater than "0", the minimum value is nonetheless 0, for example if $\beta_6=0$ (that is to say for example if, in the normal drive mode S, the difference in speed $n_{DIF}$ is greater than 2000 rpm).

In the operating strategy provided by the state machine 70 in FIG. 3, it is continuously checked whether the power $P_{EM}$ of the electric machine 40 requested in an operating mode lies within the limits defined by the limit power value values $P_{Lj}$. If necessary, a change into such a requested operating mode can then thus be prevented by means of the switching variable $s_{Lj}$, or such an operating mode can be ended.

In the above example of $P_{L1}$, it is checked in the simplest case whether, starting from the operating state "CONVENTIONAL DRIVE" 60, a change into the operating mode "ELECTRIC DRIVE" 56 is possible. This is then the case if, in the simplest case, the requested power target value $P_{EM}$ (=$P_{FW}$) is smaller than $P_{L1}$. In the above example, $P_{L1}=0$, since $\beta_6=0$, and therefore the switching variable $S_{L1}$ has the value 0 and consequently a change into the operating mode "ELECTRIC DRIVE" 56 is not possible.

The other operating mode changes are given from the same equations.

For the switching variable $s_{L2}$, the value $P_{FW}-P_{VM}$ is to be used as the target value $P_{EM}$ of the electric machine, that is to say the difference between power target value and the power already provided by the internal combustion engine. For the switching variable $s_{L3}$, a power target value $P_{LP}$, which defines the load-point increase, is to be used as the target value $P_{EM}$. For the switching variable $s_{L4}$, the power target value $P_{EM}=P_{FW}$ is to be used. For the switching variable $s_{L5}$, a target value $P_{EM}=P_{SB}$, which characterizes the overrun operation by means of electric machine 40, is to be used. This target value setting is fixed by a speed-dependent overrun power of an internal combustion engine effective virtually.

The switching variable $s_{L6}$ is established according to a target value $P_{EM}=P_{SL}$ of the electric machine, which is dependent on the status-of-charge and the power consumption of the consumers effective in the idle state.

As described above, the switching variables can be established by means of a simple establishment of a difference between the respective target value $P_{EM}$ of the electric machine and the respective limit power value $P_{Lj}$.

It is particularly preferable however if the respective switching variable $s_{Lj}$ contains a hysteresis in order to avoid frequent changes to the switching variables with target values in the vicinity of the limit power value. To this end, a time-dependent threshold $\epsilon_{sj}>0$ is used, which is defined in the application phase and is different depending on the drive program or drive comfort.

Figure 11:
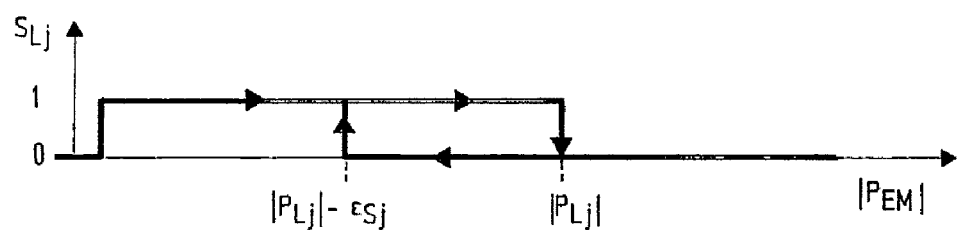
FIG. 11 shows a functional illustration of a switching variable according to the requested electric power.

A characteristic curve for establishing the respective switching variables $s_{Lj}$ is shown in FIG. 11. This is dependent on the amount $|P_{EM}|$ of the respective requested power target value. To establish the hysteresis, this power target value $|P_{EM}|$ is compared either with the amount of the respective limit power value $|P_{Lj}|$ or with a value offset therefrom $(|P_{EM}|-\epsilon_{Sj})$.

Furthermore, it is preferable if the characteristic curve $s_{Lj}=f|P_{EM}|$ is memory-conditioned. Here, $s_{Lj}$ is calculated with a sampling time $T_A$ in a time-discrete form by means of the values of $|P_{EM}(k)|$ and $|P_{Lj}(k)|$ determined at the respective moment in time $t_k=k\cdot T_A$. A recursive calculation in order to establish the switching variables $s_{Lj}$ is preferably given here as follows:

$$s_{Lj}(k)=\theta_1(k)\cdot s_{Lj}(k-1)+\theta_2(k).$$

Initial values of this recursive equation with a power request of $|P_{EM}|>0$ is $S_{Lj}(0)=1$. The form variables $\theta_1(k)$ and $\theta_2(k)$ contained in the above recursive equation are defined by the following relationships:

$$\theta_1(k) = \begin{cases} 1 & \text{for } |P_{Lj}(k)| - \varepsilon_{Lj}(k) \leq |P_{EM}(k)| \leq |P_{Lj}(k)| \\ 0 & \text{otherwise} \end{cases}$$

$$\theta_2(k) = \begin{cases} 1 & \text{for } |P_{EM}(k)| < |P_{Lj}(k)| - \varepsilon_{Lj}(k) \\ 0 & \text{otherwise} \end{cases},$$

In this case, $\epsilon_{Lj}=\epsilon_{sj}$.

Due to the above recursive equation, the power target values $P_{EM}$ of all operating modes with use of the electric machine 40 can consequently be monitored continuously in consideration of the respective power limit values $P_{Lj}$ of the electric machine.

What is claimed is:

1. In a hybrid drivetrain for a motor vehicle, the drivetrain comprising
    an internal combustion engine;
    an electric machine;
    a twin-clutch gearbox having a first friction clutch, a first sub-gearbox, a second friction clutch, and a second sub-gearbox, the first friction clutch and the first sub-gearbox forming a first branch of the twin-clutch gearbox, the second friction clutch and the second sub-gearbox forming a second branch of the twin-clutch gearbox, and the electric machine being coupled to an input shaft of one of the sub-gearboxes; and
    a controller;
    in which drivetrain power is provided by the internal combustion engine in a first operating mode and power is provided by the electric machine in a second operating mode, wherein a change from one operating mode into the other operating mode is carried out according to the state of at least one of the drivetrain and the motor vehicle,
    a method for operating the hybrid drivetrain comprises the step of controlling, in the controller, the change of the operating mode according to at least one switching variable, which is a function of a requested power target value;
    wherein the switching variable is further a function of a limit power value of the electric machine and the limit power value is a function of at least one limiting factor.

2. The method as claimed in claim 1, wherein the switching variable is a binary variable.

3. The method as claimed in claim 1, wherein the limit power value is a function of a maximum power value of the electric machine.

4. The method as claimed in claim 1, wherein the limiting factor is a value between zero and one.

5. The method as claimed in claim 1, wherein the limit power value is a function of a minimum value of a plurality of limiting factors.

6. The method as claimed in claim 1, wherein the limit power value is a function of one or more limiting factors of a group of limiting factors which includes a first limiting factor, which is a function of the temperature of the electric machine, a second limiting factor, which is a function of the temperature of a power electronics of the electric machine, a third limiting factor, which is a function of the temperature of a battery, a fourth limiting factor, which in motor operation of the electric machine is a function of a status-of-charge of the battery, a fifth limiting factor, which in regenerative operation of the electric machine is a function of the status-of-charge of the battery, a sixth limiting factor, which is a function of a re-start time of the internal combustion engine, and a seventh limiting parameter, which is a function of a torque reserve.

7. The method as claimed in claim 2, wherein a switchover of the switching variable from one binary value to the other binary value is subject to a hysteresis function in at least one direction.

8. The method as claimed in claim 1, wherein the switching variable is calculated recursively as follows:

$$s_{Lj}(k) = \theta_1(k)\cdot s_{Lj}(k-1) + \theta_2(k),$$

wherein $$\theta_1(k) = \begin{cases} 1 & \text{for } |P_{Lj}(k)| - \varepsilon_{Lj}(k) \leq |P_{EM}(k)| \leq |P_{Lj}(k)| \\ 0 & \text{otherwise} \end{cases}$$

$$\theta_2(k) = \begin{cases} 1 & \text{for } |P_{EM}(k)| < |P_{Lj}(k)| - \varepsilon_{Lj}(k) \\ 0 & \text{otherwise} \end{cases},$$

wherein
$P_{Lj}$=limit power value
$\epsilon_{Lj}$=time-dependent threshold of the hysteresis function
$P_{EM}$=requested electric power of the electric machine.

9. The method as claimed in claim 1, wherein, for a plurality of different changes from one operating mode into another operating mode, a switching variable is provided in each case, in accordance with which the respective change is controlled.

10. The method as claimed in claim 1, wherein the change of operating mode is carried out according to a re-start time and/or a difference in speed between a speed of the internal combustion engine and a cranking output speed.

11. The method as claimed in claim 10, wherein the cranking output speed is a speed of a member of the drivetrain used to start the internal combustion engine.

12. A method for operating a hybrid drivetrain for a motor vehicle, in which power is provided by an internal combustion engine in a first operating mode and power is provided by an electric machine in a second operating mode, wherein a change from one operating mode into the other operating mode is carried out according to the state of at least one of the drivetrain and the motor vehicle, the change of the operating mode being controlled, in a controller, according to at least one switching variable, which is a function of a requested power target value.

13. A method for operating a hybrid drivetrain for a motor vehicle, in which power is provided by an internal combustion engine in a first operating mode and power is provided by an electric machine in a second operating mode, wherein a change from one operating mode into the other operating mode is carried out according to the state of at least one of the drivetrain and the motor vehicle, the change of operating mode being carried out, in a controller, according to at least one switching variable, which is a function of a requested power target value and at least one of a re-start time and a difference in speed between a speed of the internal combustion engine and a cranking output speed.

14. The method as claimed in claim 13, wherein the cranking output speed is a speed of a member of the drivetrain used to start the internal combustion engine.

\* \* \* \* \*